(12) United States Patent
Bade et al.

(10) Patent No.: US 8,549,288 B2
(45) Date of Patent: Oct. 1, 2013

(54) DYNAMIC CREATION AND HIERARCHICAL ORGANIZATION OF TRUSTED PLATFORM MODULES

(75) Inventors: Steven A. Bade, Georgetown, TX (US); Stefan Berger, New York, NY (US); Kenneth Alan Goldman, Norwalk, CT (US); Ronald Perez, Mount Kisco, NY (US); Reiner Sailer, Scarsdale, NY (US); Leendert Peter Van Doorn, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 12/128,952

(22) Filed: May 29, 2008

(65) Prior Publication Data

US 2008/0235804 A1    Sep. 25, 2008

Related U.S. Application Data (63) Continuation of application No. 11/242,673, filed on Oct. 3, 2005, now abandoned.

(51) Int. Cl.
*H04L 29/06* (2006.01)

(52) U.S. Cl.
USPC .............................. 713/166; 173/155; 726/22

(58) Field of Classification Search
USPC .................... 345/418; 713/155, 166; 726/22
See application file for complete search history.

(56) References Cited

U.S. PATENT DOCUMENTS

| | | | |
|---|---|---|---|
| 7,222,062 B2 | 5/2007 | Goud et al. | |
| 7,313,679 B2 | 12/2007 | Ranganathan | |
| 7,380,119 B2 | 5/2008 | Bade et al. | |
| 7,478,246 B2 | 1/2009 | Arndt et al. | |
| 7,480,804 B2 | 1/2009 | Bade et al. | |
| 7,484,091 B2 | 1/2009 | Bade et al. | |
| 7,484,099 B2 | 1/2009 | Bade et al. | |
| 7,526,649 B2 | 4/2009 | Wiseman et al. | |
| 7,564,842 B2 | 7/2009 | Callaway et al. | |
| 7,590,867 B2 | 9/2009 | Scarlata et al. | |
| 7,603,707 B2 | 10/2009 | Seifert et al. | |
| 7,613,921 B2 | 11/2009 | Scarlata | |
| 7,664,965 B2 | 2/2010 | Bade et al. | |
| 2003/0110106 A1 | 6/2003 | Deshpande et al. | |
| 2005/0086509 A1 | 4/2005 | Ranganathan | |
| 2005/0135379 A1 | 6/2005 | Callaway et al. | |
| 2005/0138370 A1 | 6/2005 | Goud et al. | |
| 2005/0149722 A1* | 7/2005 | Wiseman et al. | ............. 713/155 |

(Continued)

OTHER PUBLICATIONS

USPTO Office Action, U.S. Appl. No. 11/242,673, Feb. 5, 2009, 12 pages.

(Continued)

*Primary Examiner* — Jeffrey Pwu
*Assistant Examiner* — Thong Truong
(74) *Attorney, Agent, or Firm* — Yee & Associates, P.C.

(57) ABSTRACT

A trusted platform module is presented that is capable of creating, dynamically, multiple virtual trusted platform modules in a hierarchical organization. A trusted platform module domain is created. The trusted platform module creates virtual trusted platform modules, as needed, in the trusted platform module domain. The virtual trusted platform modules can inherit the permissions of a parent trusted platform module to have the ability to create virtual trusted platform modules themselves. Each virtual trusted platform module is associated with a specific partition. Each partition is associated with an individual operating system. The hierarchy of created operating systems and their privilege of spawning new operating systems is reflected in the hierarchy of trusted platform modules and the privileges each of the trusted platform modules has.

15 Claims, 9 Drawing Sheets

(56) References Cited

U.S. PATENT DOCUMENTS

| | | |
|---|---|---|
| 2005/0246521 A1 | 11/2005 | Bade et al. |
| 2005/0246525 A1 | 11/2005 | Bade et al. |
| 2005/0246552 A1 | 11/2005 | Bade et al. |
| 2005/0257073 A1 | 11/2005 | Bade et al. |
| 2006/0020781 A1 | 1/2006 | Scarlata et al. |
| 2006/0026418 A1 | 2/2006 | Bade et al. |
| 2006/0026419 A1 | 2/2006 | Arndt et al. |
| 2006/0026422 A1 | 2/2006 | Bade et al. |
| 2006/0026693 A1 | 2/2006 | Bade et al. |
| 2006/0256108 A1* | 11/2006 | Scaralata ............... 345/418 |
| 2007/0006306 A1* | 1/2007 | Seifert et al. ............ 726/22 |
| 2007/0016801 A1 | 1/2007 | Bade et al. |

\* cited by examiner

DYNAMIC CREATION AND HIERARCHICAL ORGANIZATION OF TRUSTED PLATFORM MODULES

This application is a continuation of application Ser. No. 11/242,673, filed Oct. 3, 2005, status pending.

BACKGROUND OF THE INVENTION

1. Field of the Invention

The present invention relates generally to a data processing system. Specifically, the present invention provides a method, an apparatus and a computer program product for the dynamic creation and hierarchical organization of trusted platform modules.

2. Description of the Related Art

The Trusted Computing Group has defined the functionality and protocol for a hardware module called the Trusted Platform Module (TPM). This piece of hardware offers security and cryptographic functionality to computer systems such as, for example, asymmetric key generation, decryption, encryption, signing, sealing and binding of data to the state of the TPM, migration of keys between TPMs, random number generation and hashing functionality. A TPM also implements a rather complex state machine which allows some of its operations to only be performed when a sequence of certain commands has been sent to the TPM before. One example of this is that a TPM owner can only be set if an endorsement key has been created previously.

Many hardware vendors ship their computing systems equipped with a TPM soldered to the motherboard, which allows widespread usage of the TPM by operating systems such as Linux® or Windows®. It is expected that future versions of the Windows® operating system will support trusted computing with the TPM, and use it, for example, for securely booting a system.

The interest in support for trusted computing on virtualizeable systems is growing as hardware virtualization becomes available for more hardware. Being able to run multiple operating systems on one machine will not remain an area only for high-end servers but will become widely available soon. Also, there are already several hypervisors in use today that were built for hardware that has been virtualizeable for many years. A hypervisor is a layer of software running on a platform that allows multiple instances of operating systems. Trusted computing is of interest for building operating system architectures and improving their security. Currently, TPMs are not available for virtualizeable platforms.

SUMMARY OF THE INVENTION

The present invention provides a method, system, and computer program product for the dynamic creation and hierarchical organization of trusted platform modules. A trusted platform module domain is created. The trusted platform module may dynamically create virtual trusted platform modules, as needed, in the trusted platform module domain. The created virtual platform modules are called child trusted platform modules and the creating trusted platform module is known as a parent module. Each virtual trusted platform module is associated with a specific partition. Each partition is associated with an individual operating system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
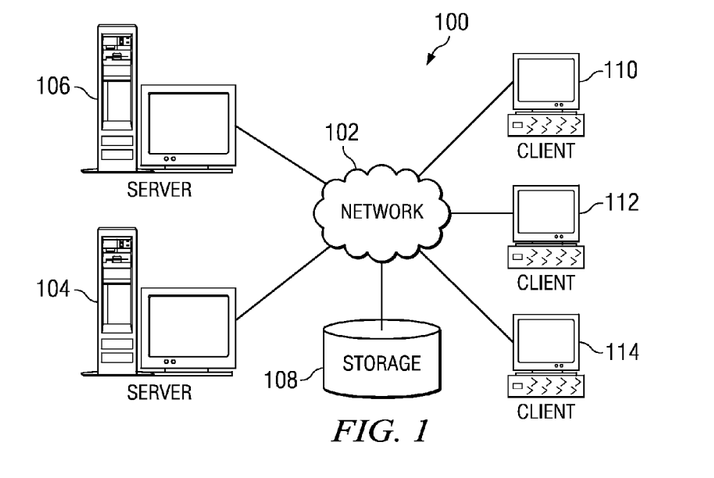
FIG. 1 is a pictorial representation of a network of data processing systems in which exemplary aspects of the present invention may be implemented.
Figure 2:
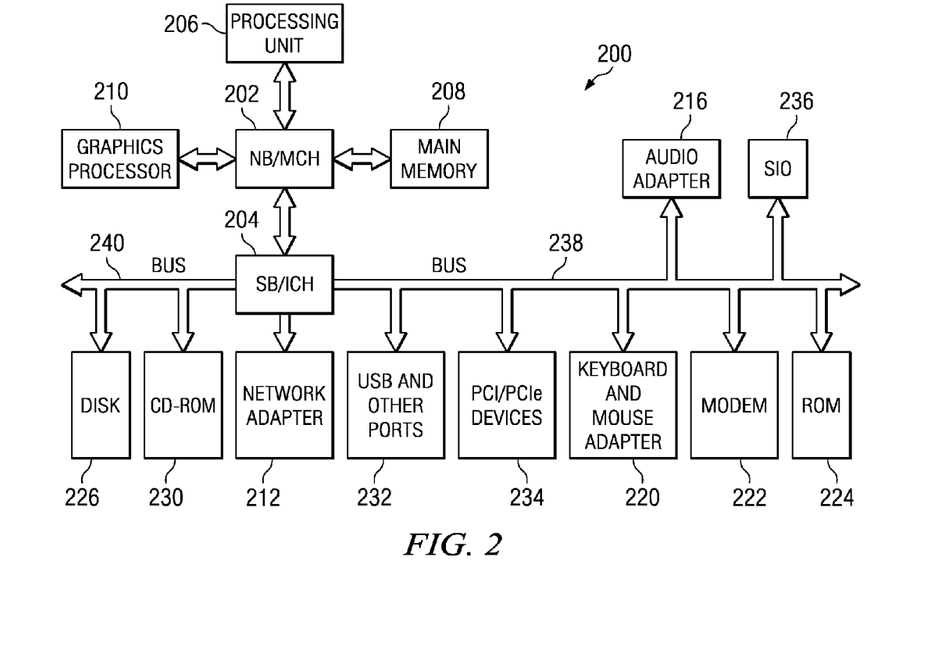
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, LAN adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
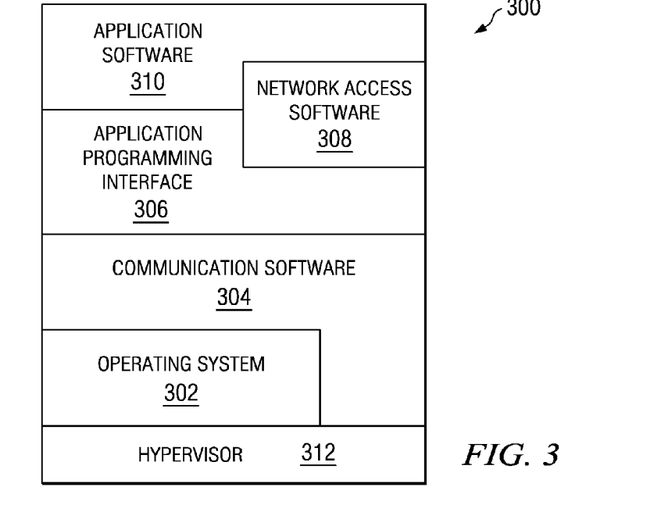
FIG. 3 is a block diagram showing typical software architecture for a server-client system in accordance with a preferred embodiment of the present invention.

Turning to FIG. 3, typical software architecture, generally designated by reference number 300, for a server-client system is depicted in accordance with a preferred embodiment of the present invention. At the lowest level, operating system 302 is utilized to provide high-level functionality to the user and to other software. Operating system 302 may be implemented in server 104 or client 110 in FIG. 1, in which computer usable code or instructions implementing the processes for embodiments of the present invention may be located. Such an operating system typically includes BIOS. Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a LAN, WAN, or the Internet. With the Internet, this software may include programs, such as Web browsers.

Application software 310 represents any number of software applications designed to react to data through a communications port to provide the desired functionality the user seeks. Applications at this level may include those necessary to handle data, video, graphics, photos or text, which can be accessed by users of the Internet. Hypervisor 312 is a layer of software running on a platform that allows multiple instances of operating systems.

One of the most interesting areas of usage for the TPM is the realization of a trusted computing architecture within an operating system. The purpose of a trusted computing architecture is for a system to be able to establish trust into another system by learning about the software that has been started on that system. The trusted computing architecture implements the concept of attestation, where attestation is based on the process of measuring all executables, libraries and script files by calculating their individual hash values, and accumulating those in Platform Configuration Registers (PCRs) of the TPM. Using the accumulated hash values along with the list of started programs and their individual measurements, other systems can determine which version of software has been started on a particular system. Attestation itself is performed by a system reporting the current values of the system's PCR registers and providing a signature over the reported values using a system-specific key. The knowledge about running software can be used to establish trust into this system by comparing the individual hash values of the applications with previously measured values stored in a database as well as accumulating the hash values and comparing the results to the values of the reported PCR registers. The fact that measurements initially are taken at the earliest point through the BIOS, followed by the bootloader and the operating system and the fact that the PCR register values are signed, prevents a system from cheating about the list of software that has been started.

The usage and functionality of the TPM is defined through the TPM command protocol, which defines the command set a TPM needs to implement and what parameters are passed in each command. The TPM protocol is strictly request/response-based and a TPM processes one command after another in strict sequence.

The TPM supports around 120 different commands which have been put into more than 30 functional groups. Some of the most important functionality of the TPM is the support of storage functions, where encrypted information can be tied to the state of a TPM and can only be decrypted once the TPM has been set into that state again, for example after a reboot of the platform. Other functionality comprises the creation of keys and means to migrate keys from one TPM to another. The execution time that some of the TPM commands need greatly varies from one command type to another. Key creation, for example, can be regarded as a command that takes a long time, whereas, for example, the calculation of a hash value completes rather quickly. Since the TPM executes all commands in sequence, no other commands can complete while, for example, a key is created. This is important for multitasking/multiprocessing environments where possibly multiple processes might want to use the system's TPM at one specific instance.

Computer systems that have the capability of running multiple operating systems at the same time will also desire to extend support for trusted computing in a similar way as it has been made available for single operating system environments. In such a case, each partition needs to have access to its own virtual TPM instance.

For the startup of the first operating system domain running on top of the hypervisor, measurements are handled in the same manner as in the case where an operating system is not running on top of a hypervisor. In this case, the BIOS is regarded as a trusted root and starts taking the measurements. Specifically, the BIOS measures the BIOS code, the contents of the Master Boot Record, and the first stage of the boot loader and accumulates the measurements into several dedicated PCR registers. The bootloader grub is modified to measure the kernel and initial random access memory (RAM) disks, which are provided as parameters in a script file that the bootloader grub reads when the system is booted. Once the operating system starts, all measurements that are made there for libraries, scripting files and executables are accumulated in TPM PCR registers.

Every TPM holds state, which consists of volatile and non-volatile data. This includes the endorsement key pair, the storage root key and all other private keys that are held inside the TPM. Also associated with a TPM are a particular owner and the owner's password. In the model of a single operating system on a machine, different machines with their own TPMs are likely to have different owners. Transferring this association between ownership and TPMs to platforms with multiple operating systems means that one instance of a TPM should be associated with one particular partition. Since partitions can be stopped and started, it is necessary to maintain the association between each partition and each instance of a TPM over the lifetime of a TPM or partition configuration.

The measurements that each operating system produces are treated in a similar way as those treated on a single-operating system. The difference is that measurements taken by the bootloader do not exist for any partition other than the one that is started first. Since on many systems the first partition will be involved in starting other partitions, it is this partition's responsibility to take any possible measurements and prepare the TPM to reflect them. This means, for example, measuring the kernel image and the initial RAM disk if a Linux® kernel is to be started.

A virtual TPM allows for the collection of measurements of multiple operating systems. Each operating system is offered its own instance of a TPM where it can create an endorsement key, storage root key, take ownership of the TPM and apply its own owner password. In an exemplary embodiment of the present invention, the normal command set that a TPM understands is expanded to allow management of additional instances of a TPM, such as, for example, creating new instances, deleting the new instances, preparing the new instances for usage by a partition, and sending commands to new instances indirectly through forwarding messages from other instances. Further, the extension of the command set enables the download of the complete state of a TPM, including non-volatile RAM (NVRAM) areas, and internally held keys into a file and recreating the TPM state in another multi-instance capable TPM and resume operation there.

In an exemplary embodiment, a virtual TPM runs on a piece of hardware other than current TPMs that are soldered to the motherboard. One such piece of hardware, for example, could be a microprocessor similar to a current single instance TPM with the difference that the hardware should be faster in order to provide enough speed for concurrent processing of TPM requests.

Figure 4:
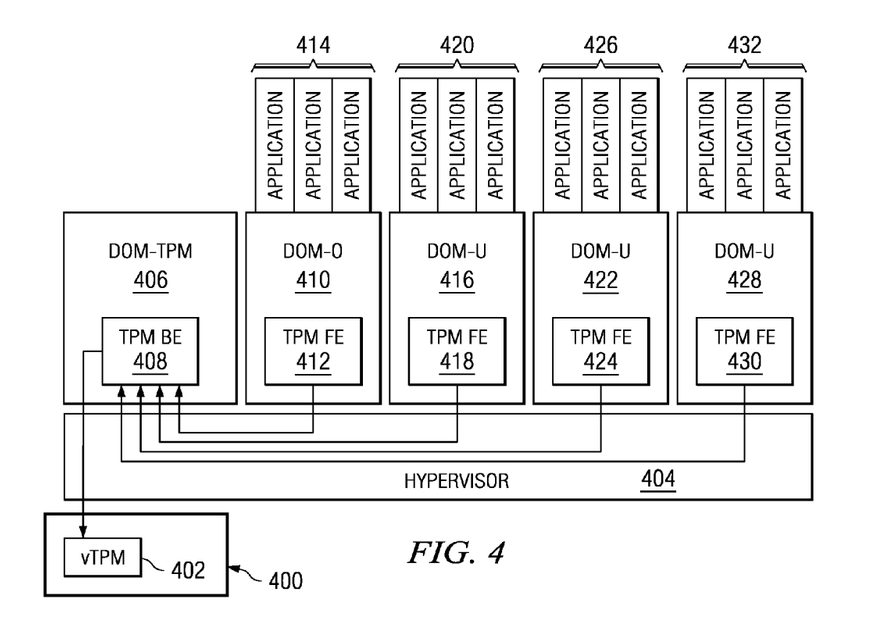
FIG. 4 is a block diagram depicting an example of an architecture for implementing a virtual TPM in accordance with an exemplary embodiment of the present invention.

FIG. 4 is a block diagram depicting an example of an architecture for implementing a virtual TPM in accordance with an exemplary embodiment of the present invention. In the case of FIG. 4, hardware 400 provides the only TPM functionality in the system, TPM 402. In the present example, the hardware is the IBM XCrypto™ card. In this case, all attestations from the BIOS, bootloader, and the first started domain, here the TPM domain, DOM-TPM 406, is recorded in instance 0. Instance 0 exists in virtual TPM, vTPM 402 of hardware 400 and is always present. DOM-TPM 406 is a dedicated TPM domain with a minimum of applications running. Therefore, DOM-TPM 406 only handles functions related to the TPM. This reduces the chance of errors occurring, increases reliability and improves the trusted computing base.

DOM-TPM 406 contains the back-end driver TPM BE 408. TPM BE 408 communicates with the front-end drivers of the other domains, TPM FE 412, 418, 424 and 430. The back-end driver is aware of which partition a request is coming from since a unique interrupt number has been assigned to each instance of the back-end driver for each front-end communication partner.

Instance 0 records the measurements taken by the BIOS, bootloader and TPM domain. Instance 1 records the measurements for domain 0, DOM-0 410, which is started as the second domain. Instance 1 also resides in vTPM 402 of hardware 400. Further instances, all of which will reside in vTPM 402 of hardware 400, are created as needed when additional domains are created. DOM-0 410, DOM-U 416, DOM-U 422 and DOM-U 428 are additional domains all of which are running separate operating systems in their virtualized partition. In the example depicted, each domain has multiple applications, 414, 420, 426 and 432 running. DOM-0 410, DOM-U 416, DOM-U 422 and DOM-U 428 communicate with DOM-TPM 406 through exchange of data over a channel provided by the hypervisor 404. DOM-TPM 406 then communicates with vTPM 402.

Figure 5:
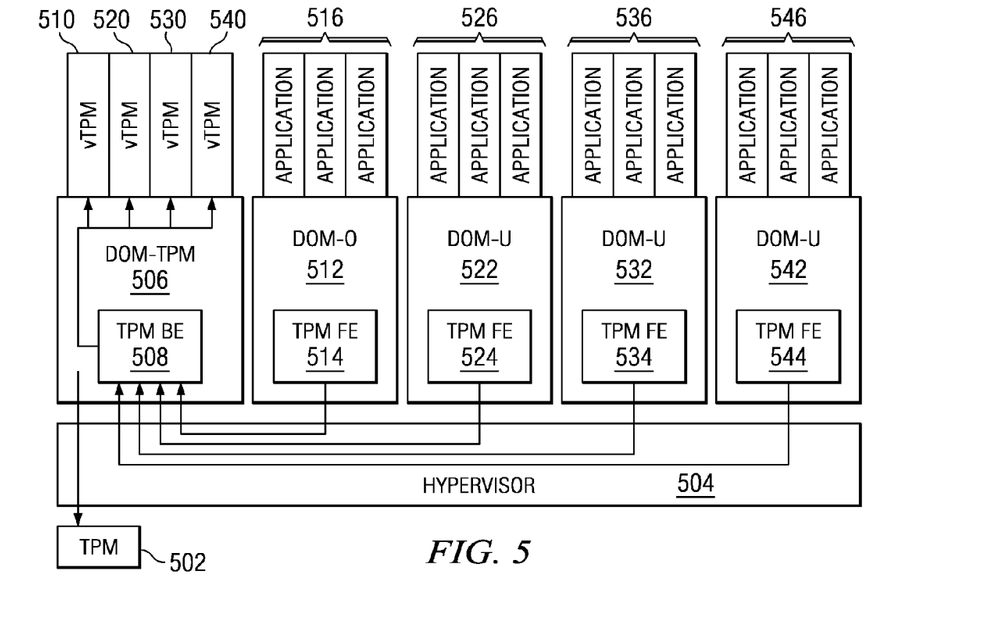
FIG. 5 is a block diagram depicting an example of an architecture that has a TPM on the motherboard and the virtual TPM functionality as software in the TPM domain in accordance with an exemplary embodiment of the present invention.

FIG. 5 is a block diagram depicting an example of an architecture that has a TPM on the motherboard and the virtual TPM functionality as software in the TPM domain in accordance with an exemplary embodiment of the present invention. In an exemplary embodiment of the present invention, TPM 502 is a TPM located on a motherboard. Similar to the architecture of FIG. 4, attestations from the BIOS, bootloader and the TPM domain, DOM-TPM 506, are recorded in TPM 502. DOM-TPM 506 is a dedicated TPM domain with a minimum of applications running. Therefore, DOM-TPM 506 only handles functions related to the TPM. This reduces the chance of errors occurring, increases reliability and improves the trusted computing base.

DOM-TPM 506 contains back-end driver TPM BE 508. TPM BE 508 communicates with the front-end drivers of the other domains, TPM FE 514, 524, 534 and 544. The back-end driver is aware of which partition a request is coming from since a unique interrupt number has been assigned to each instance of the back-end driver for each front-end communication partner.

However, unlike FIG. 4, future instances and all virtual TPMs, vTPM 510, 520, 530, and 540 are created and exist in DOM-TPM 506. Instance 0 of the vTPM 510 records the measurements for domain 0, DOM-0 512, which is started as the second domain. Further instances and virtual TPMs, vTPM 520, 530 and 540 are created as need when additional domains, such as DOM-U 522, DOM-U 532, and DOM-U 542, are created. Each virtual TPM corresponds to one specific domain. In the present example vTPM 510 corresponds to DOM-0 512, vTPM 520 corresponds to DOM-U 522, vTPM 530 corresponds to DOM-U 532, and vTPM 540 corresponds to DOM-U 542. In the example depicted, each domain has multiple applications, 516, 526, 536, and 546 running. DOM-0 512, DOM-U 522, DOM-U 532, and DOM-U 542 communicate with DOM-TPM 506, and their respective virtual TPMs through exchange of data over a channel provided by the hypervisor 504.

The architectures illustrated in FIGS. 4 and 5 both have in common that the TPM domain effectively provides proxy functionality for TPM services, with the difference being that of where the processing of the TPM requests is happening. The final processing or TPM requests in FIG. 4 happens in the external Xcrypto™ card, whereas in FIG. 5 all TPM requests are processed by the TPM software implementation in the vTPM instances 510, 520, 530, and 540. The architecture depicted in FIG. 4 may also be considered as more secure, since all TPM functionality is provided by the hardware.

Figure 6:
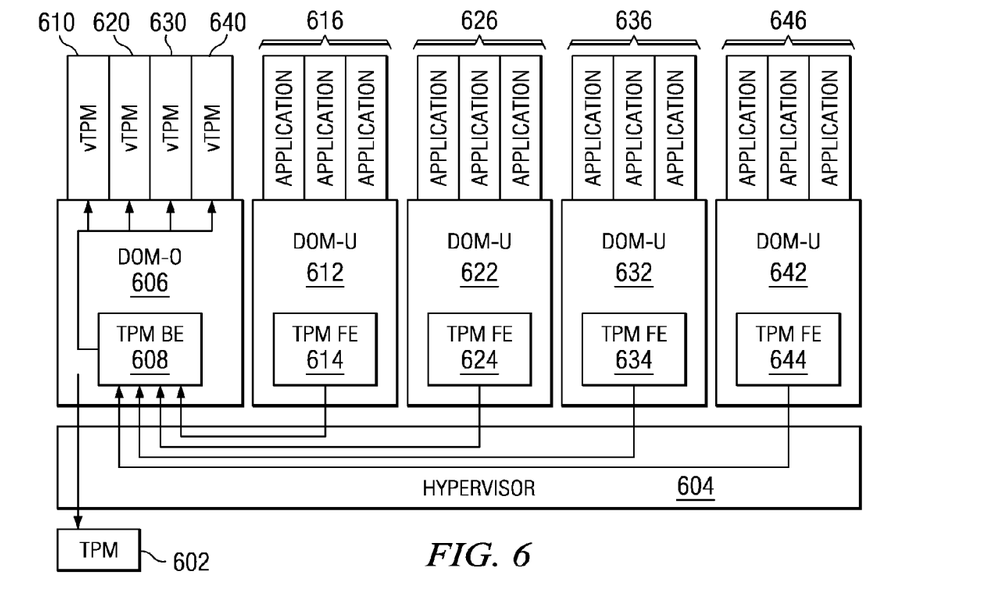
FIG. 6 is a block diagram depicting an example of an architecture with a TPM on the motherboard and the virtual TPM functionality as software in the domain 0 in accordance with an exemplary embodiment of the present invention.

FIG. 6 is a block diagram depicting an example of an architecture with a TPM on the motherboard and the virtual TPM functionality as software in the domain 0 in accordance with an exemplary embodiment of the present invention. In an exemplary embodiment of the present invention, TPM 602 is a TPM located on a motherboard. Unlike the architectures of FIGS. 4 and 5, hypervisor 604 always boots domain 0, DOM-0 606, as the first domain, which forces all virtual TPM functionality into domain 0. DOM-0 606 is not a dedicated TPM domain. DOM-0 606 has other functionality besides handling TPM functions. For example, DOM-0 606 also handles the creation of the other domains, DOM-U 612, DOM-U 622, DOM-U 632, and DOM-U 642.

Attestations from the BIOS, bootloader and DOM-0 606, are recorded in TPM 602. DOM-0 606 contains back-end driver TPM BE 608. TPM BE 608 communicates with the front-end drivers of the other domains, TPM FE 614, 624, 634 and 644. The back-end driver is aware of which partition a request is coming from since a unique interrupt number has been assigned to each instance of the back-end driver for each front-end communication partner.

Further instances and virtual TPMs, vTPM 610, 620, 630, and 640 are created as needed when user domains, such as DOM-U 612, DOM-U 622, DOM-U 632, and DOM-U 642 are created. Each virtual TPM corresponds to one specific domain. In the present example vTPM 610 corresponds to DOM-U 612, vTPM 620 corresponds to DOM-U 622, vTPM 630 corresponds to DOM-U 632, and vTPM 640 corresponds to DOM-U 642. In the example depicted, each domain has multiple applications, 616, 626, 636 and 646, running. DOM-U 612, DOM-U 622, DOM-U 632, and DOM-U 642 communicate with DOM-0 606, and their respective virtual TPMs through exchange of data over a channel provided by the hypervisor 604.

One of the issues with the dynamicity of the virtual TPM is the handling of the endorsement key of each created instance. For today's TPMs that are soldered to the computer's motherboard, the platform manufacturer establishes the endorsement key pair when the machine is built and issues a certificate for the public key part of the endorsement key. The owner of the machine can use the certificate to prove ownership of the machine. The certificate also indicates that the device in which the private key is stored is, in fact, a TPM device which hides the private key from its owner.

Since the virtual TPM creates TPMs dynamically, the platform manufacturer can not know the public key parts of all created endorsement keys. However, the manufacturer can certify the public key part of the endorsement key of instance 0 and provide the certificate to the platform owner. Then, to create certificates of individual instances of the TPM, the TPM instance 0 can be used to certify the endorsement keys of its TPM child instances by effectively creating a certificate chain. To realize this in a simple way, the public key part of the endorsement key of every TPM instance can be certified through instance 0 issuing a signature over that endorsement key using its own endorsement key, or attestation identity key (AIK) for signing.

Since multiple operating systems will submit their measurements to a multi-instance TPM, it is apparent that strict sequential processing of all individual TPM requests will not allow an operating systems to run efficiently. For example, individual partitions would be blocked until another partition's request is completed. An exemplary embodiment of the present invention solves this problem by creating a pool of threads at the lowest level of the TPM. The pool of threads allows concurrent processing of multiple requests. At any given time only one thread is waiting for a TPM request in the driver. Once it has received a TPM request, it leaves the kernel driver and starts processing that request inside the targeted TPM instance while the next thread has been released to wait for the next request. In an exemplary embodiment of the present invention, this feature is achieved through the usage of thread locks. In another exemplary embodiment of the present invention, through a similar way of using locking mechanisms, only one thread is allowed to write a response to the driver.

In an exemplary embodiment of the present invention, the demultiplexing of TPM requests to be able to route them to their intended instance is solved through proper setup of the TPM back-end driver that is located under the virtual TPM. Through domain configuration files, known as virtual machine configuration files, a declaration of what instance of the TPM will be associated with which partition is made. This is configuration information that applies only to the back-end driver and allows the back-end driver to prepend a 4-byte instance number to the TPM request before the TPM request is passed to the TPM running in the user level. The instance number is made available to the back-end driver when the back-end and front-end are setup for communication during partition bootup time. The back-end driver is aware of which partition a request is coming from through the unique interrupt number that has been assigned to the back-end driver for each front-end communication partner. Therefore, as prepending the instance number may be handled more securely on the back end-side, in an exemplary embodiment of the present invention, the instance number is not prepended in the front-end side. Additionally, this prevents accidentally forging the source of a request.

In an exemplary embodiment of the present invention, the same kind of channel that is used for a user partition to communicate with a TPM instance may also exist for communication between the privileged domain 0 and the TPM domain. One reason for this is that the extended command set uses the same layout for TPM commands as all the existing TPM commands do. Therefore, this channel can deliver those commands to the TPM. Additionally, downloading the state of a TPM requires a fair amount of byte transfer towards the privileged domain, which can, at least in some architecture, not be accommodated through event channels. The setup procedure of the TPM back-end and front-end drivers serves as an establishment phase for a channel, but not necessarily as an instantiation request for a TPM instance. In an exemplary embodiment of the present invention, an instantiation request for TPMs occur on a higher layer through the exchange of commands using the established channel.

Depending on the availability of hardware capable of supporting a virtual TPM, the TPM domain may provide two different sets of functionality. One case is where there is no hardware available to support a virtual TPM. In this case, a software TPM would be hosted in the TPM domain or domain 0 and process the requests from all other domains, as shown in FIGS. 5 and 6 respectively. In the second case, where a hardware TPM is available, on the PCI bus for example, the TPM domain becomes a pure proxy domain for transferring data from the back-end driver to the PCI device driver and vice versa, as shown in FIG. 4. A user-level application would not be necessary in this case.

In an exemplary embodiment of the present invention, a higher level tool exists that knows throughout the lifetime of a system which partition is associated with which instance of a TPM. Whenever a new partition is created, a TPM instance should automatically be created and that association established for as long as the partition's definition is kept on the system. When a partition is suspended, the TPM's state could also be suspended and the instance be deleted until either the partition is migrated to a new system or restarted on the local system. In both cases a new instance of a TPM should be created, the TPM state be restored and the partition configuration file updated accordingly. The higher level tool should hide the peculiarities of the partition configuration files from the user.

On a broad level, the additional TPM commands can be grouped into two different groups: (i) Virtual TPM Management functions and (ii) Virtual TPM Migration support functions.

The first group of functions enables a user to create and delete virtual TPM instances inside a TPM as well as prepare the virtual TPM instances for immediate submission of measurements when a partition starts up. The TPM's PCR registers may be pre-loaded with some initial values from measurements taken about the kernel and the initial RAM disk (initrd). In an exemplary embodiment of the present invention, a virtual TPM has been implemented in such a way that the first instance, the one that is always available, allows the creation of additional virtual TPM instances. The additional TPM instances themselves may be created as privileged instances which may inherit the ability to create additional instances. Using this functionality, a user may effectively build a tree of TPM instances.

The second group of TPM functions enables a user to download state information from the TPM and store it into a file and later on recreate the TPM on a different system. The state of the TPM is comprised of NVRAM, keys, volatile and non-volatile flags, established session, and counters. The availability of instances of each type are queried and downloaded, one after another, and their content are stored into a file. When recreating an instance, the contents of the file are read and uploaded to the new instance.

In an exemplary embodiment of the present invention, the extended commands are designed such that they pick up on the philosophy of existing TPM commands for authorization using nonces, which are unique session identifiers, and password-keyed hashes, such as the keyed-hash message authentication code (HMAC), for single or double authorization of the owner or keys. This additional security is not a burden on processing power, since the calculation of SHA-1 hashes, which is the most commonly used function in the secure hash algorithm (SHA) family, is comparatively inexpensive, and the additional authorization adds a level of security.

Typically, an application using virtual TPM commands will build and send a request to the virtual TPM. The virtual TPM receives the request, processes the request, builds a response and then sends a response to the application. In FIGS. 5 and 6, the request for the virtual TPM is communicated from the front-end driver to the back-end driver through the hypervisor. The back-end driver then routes the request to the proper virtual TPM, as the back-end driver and the virtual TPMs reside in the same domain, DOM-TPM 506 in FIG. 5 or DOM-0 606 in FIG. 6. However, in the architecture illustrated in FIG. 4, the back-end driver passes the request onto the hardware device. The software on the hardware device, which is where the virtual TPMs reside in FIG. 4, directs the requests to the proper virtual TPMs.

Figure 7:
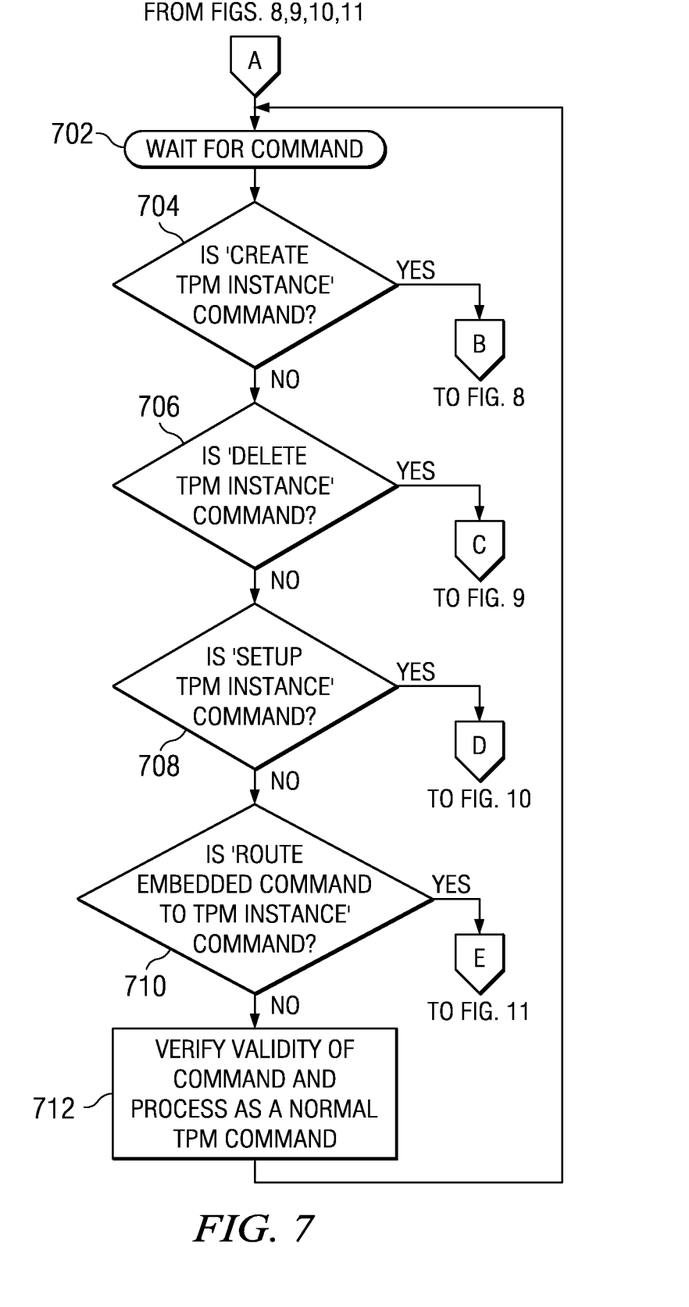
FIG. 7 is a flowchart illustrating a method for handling TPM commands in accordance with an exemplary embodiment of the present invention.

FIG. 7 is a flowchart illustrating a method for handling TPM commands in accordance with an exemplary embodiment of the present invention. The operation begins with the TPM waiting to receive a command (step 702). Once a command is received, the TPM determines if the command is a "create TPM instance" command (step 704). If the command is the create TPM instance command (a yes output to step 704), then create the TPM instance as explained in greater detail in FIG. 8. If the command is not the create TPM instance command (a no output to step 704), then the TPM determines if the command is a "delete TPM instance" command (step 706).

Figure 9:
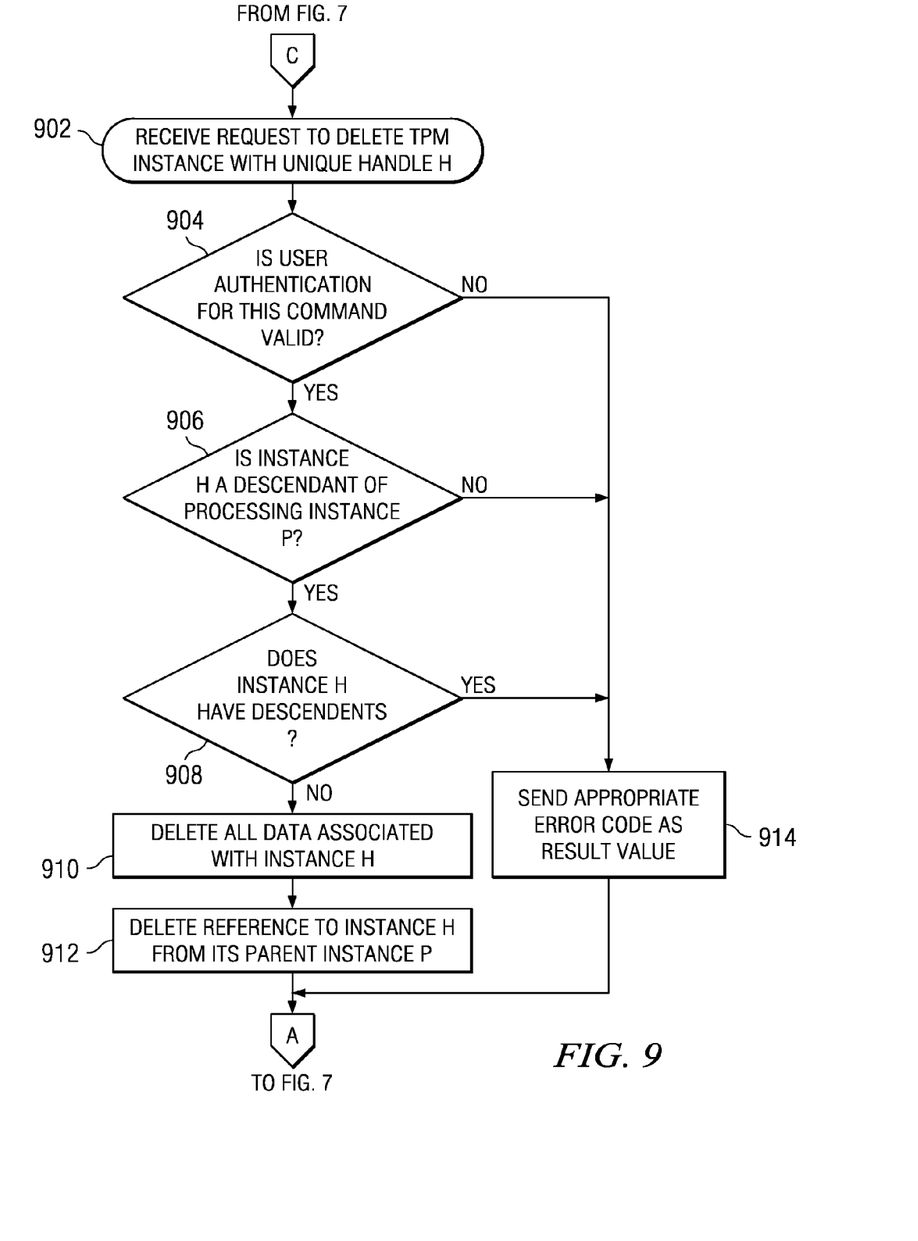
FIG. 9 is a flowchart illustrating a method for handling a delete TPM instance command in accordance with an exemplary embodiment of the present invention.
Figure 10:
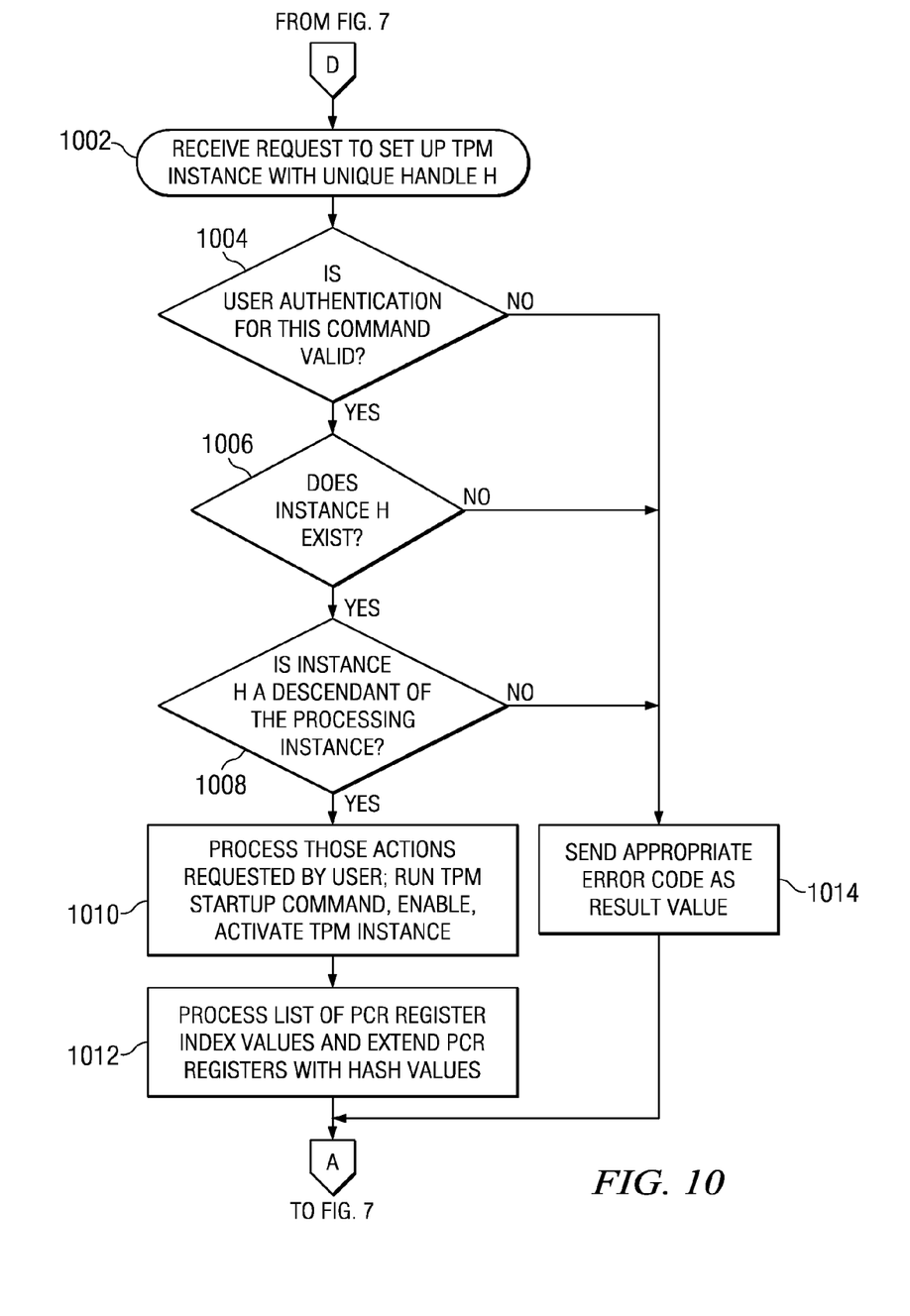
FIG. 10 is a flowchart illustrating a method for handling a setup TPM instance command in accordance with an exemplary embodiment of the present invention.

If the command is the delete TPM instance command (a yes output to step 706), then delete the TPM instance as explained in greater detail in FIG. 9. If the command is not the create TPM instance command (a no output to step 706), then the TPM determines if the command is a "setup TPM instance" command (step 708).

Figure 11:
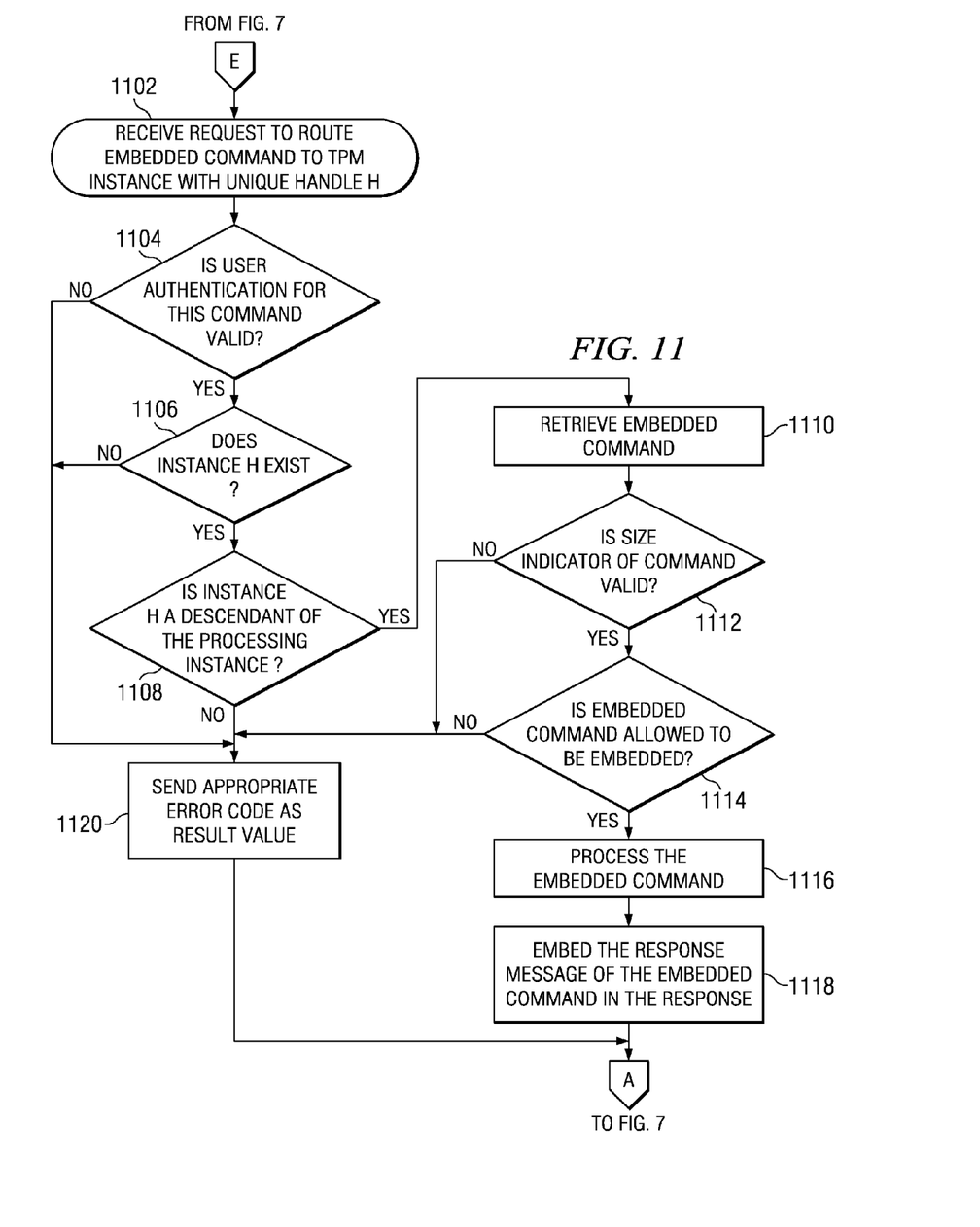
FIG. 11 is a flowchart illustrating a method for handling a route embedded command to TPM instance command in accordance with an exemplary embodiment of the present invention.

If the command is the setup TPM instance command (a yes output to step 708), then setup the TPM instance as explained in greater detail in FIG. 10. If the command is not the setup TPM instance command (a no output to step 708), then the TPM determines if the command is a "route embedded command to TPM instance" command (step 710).

If the command is the route embedded command to TPM instance command (a yes output to step 710), then route the embedded command to the TPM instance as explained in greater detail in FIG. 11. If the command is not the route embedded command to TPM instance command (a no output to step 710), then the TPM verifies the validity of the command (step 712) and processes it as a normal TPM command, eventually returning to step 702.

Figure 8:
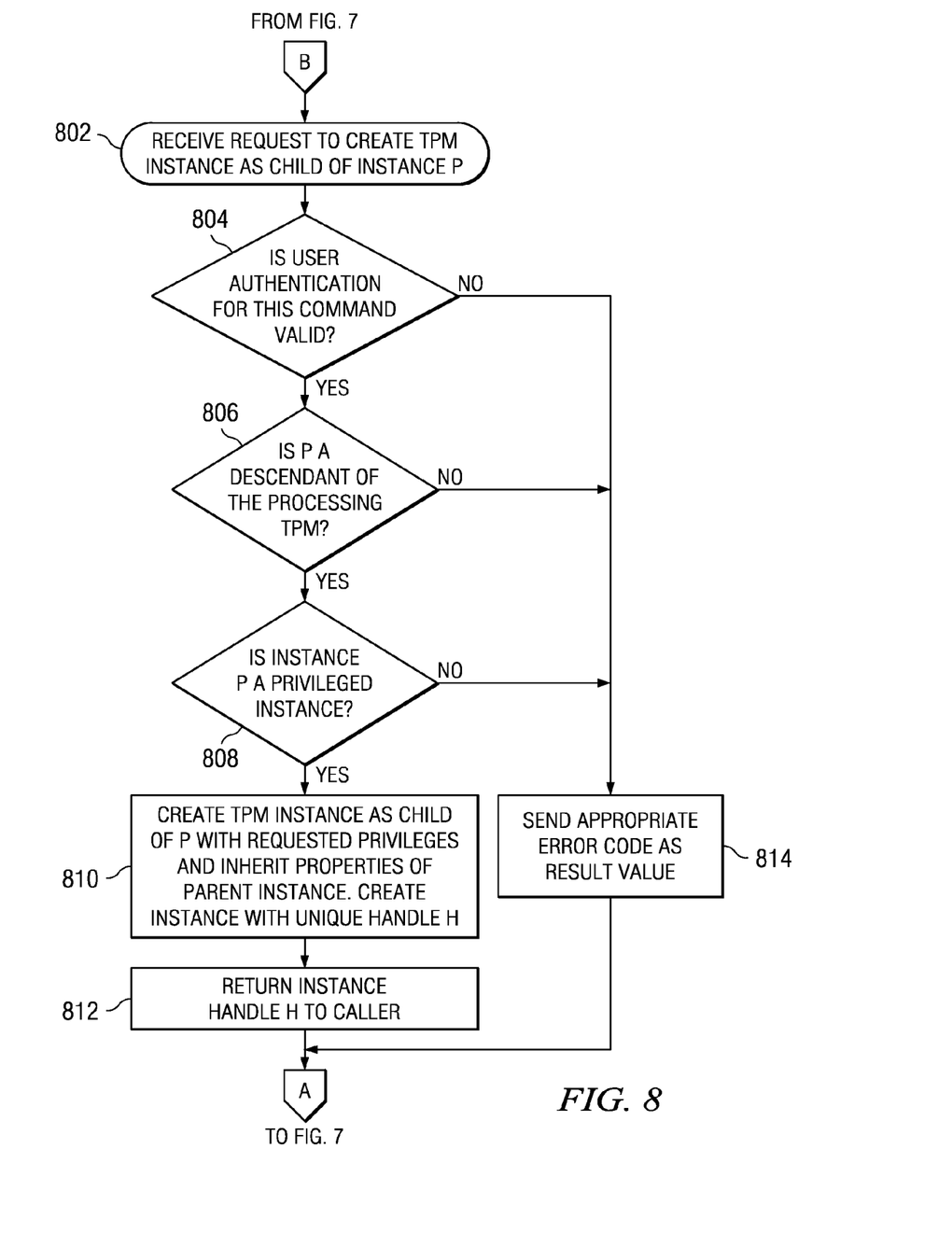
FIG. 8 is a flowchart illustrating a method for handling a create TPM instance command in accordance with an exemplary embodiment of the present invention.

FIG. 8 is a flowchart illustrating a method for handling a create TPM instance command in accordance with an exemplary embodiment of the present invention. The operation begins by receiving a command to create a TPM instance as the child of instance P, where instance P is the parent instance (step 802). Next the operation verifies if user authentication for the command is valid (step 804). If the user authentication for the command is not valid (a no output to step 804), the appropriate error code is sent as the result value (step 814) and the operation returns to step 702 of FIG. 7 to wait for a new command to process. If the user authentication for the command is valid (a yes output to step 804), the operation determines if instance P is a descendant of the processing TPM (step 806).

If instance P is not a descendant of the processing TPM (a no output to step 806), the appropriate error code is sent as the result value (step 814) and the operation returns to step 702 of FIG. 7 to wait for a new command to process. If instance P is a descendant of the processing TPM (a yes output to step 806), the operation determines if instance P is a privileged instance (step 808). A privileged instance is an instance with permission to create other, child instances.

If instance P is not a privileged instance (a no output to step 808), the appropriate error code is sent as the result value (step 814) and the operation returns to step 702 of FIG. 7 to wait for a new command to process. If instance P is a privileged instance (a yes output to step 808), the operation creates a TPM instance as the child of instance P with all the requested privileges (step 810). The child TPM instance inherits the properties of parent instance P. The child TPM is assigned a unique instance handle H. Unique instance handle H is returned to the caller (step 812) and the operation returns to step 702 of FIG. 7 to wait for a new command to process.

FIG. 9 is a flowchart illustrating a method for handling a delete TPM instance command in accordance with an exemplary embodiment of the present invention. The operation begins by receiving a command to delete a TPM instance with the unique instance handle H (step 902). Next the operation verifies if user authentication for the command is valid (step 904). If the user authentication for the command is not valid (a no output to step 904), the appropriate error code is sent as the result value (step 914) and the operation returns to step 702 of FIG. 7 to wait for a new command to process. If the user authentication for the command is valid (a yes output to step 904), the operation determines if instance H is a descendant of the processing instance P (step 906).

If instance H is not a descendant of the processing TPM (a no output to step 906), the appropriate error code is sent as the result value (step 914) and the operation returns to step 702 of FIG. 7 to wait for a new command to process. If instance H is a descendant of the processing TPM (a yes output to step 906), the operation determines if instance H has descendants (step 908).

An instance may only be deleted if it does not have any children instances that are dependent upon it. If instance H has any descendants (a yes output to step 908), the appropriate error code is sent as the result value (step 914) and the operation returns to step 702 of FIG. 7 to wait for a new command to process. If instance H does not have any descendants (a no output to step 908), the operation deletes all data associated with instance H (step 910). The operation deletes all references to instance H from the parent instance P (step 912) and the operation returns to step 702 of FIG. 7 to wait for a new command to process.

FIG. 10 is a flowchart illustrating a method for handling a setup TPM instance command in accordance with an exemplary embodiment of the present invention. To setup a TPM instance means to prepare the instance for usage. In an exemplary embodiment of the present invention, an application in domain 0 sends a sequence of commands to a privileged TPM instance to prepare the virtual TPM instance to accept commands from the operating system, which has a similar effect to the commands that usually the BIOS is sending to the hardware TPM to prepare it for accepting commands from the operating system. In addition to that the application is providing an array of PCR register indices and hash values along with string identifiers. For this command to work, the virtual TPM instance must have been created prior to this step and is uniquely identified through its unique instance handle H. The operation begins by receiving a command to setup a TPM instance with the unique instance handle H (step 1002). Next the operation verifies if user authentication for the command is valid (step 1004). If the user authentication for the command is not valid (a no output to step 1004), the appropriate error code is sent as the result value (step 1014) and the operation returns to step 702 of FIG. 7 to wait for a new command to process. If the user authentication for the command is valid (a yes output to step 1004), the operation determines if instance H exists (step 1006).

If instance H does not exist (a no output to step 1006), the appropriate error code is sent as the result value (step 1014) and the operation returns to step 702 of FIG. 7 to wait for a new command to process. If instance H does exist (a yes output to step 1006), the operation determines if instance H is a descendant of the processing instance P (step 1008).

If instance H is not a descendant of the processing instance P (a no output to step 1008), the appropriate error code is sent as the result value (step 1014) and the operation returns to step 702 of FIG. 7 to wait for a new command to process. If instance H is a descendant of the processing instance P (a yes output to step 1008), the operation processes those actions requested (step 1010). Such processes include running the TPM startup command and enabling and activating the TPM instance H. The operation processes the list of PCR register index values and extends PCR registers with the given hash values (step 1012). The operation returns to step 702 of FIG. 7 to wait for a new command to process.

FIG. 11 is a flowchart illustrating a method for handling to route an embedded command to a virtual TPM instance command in accordance with an exemplary embodiment of the present invention. The operation begins by a privileged TPM receiving a command and determining that this command routes an embedded command to a TPM instance with the unique instance handle H (step 1102). Next the operation verifies if user authentication for the command is valid (step 1104). If the user authentication for the command is not valid (a no output to step 1104), the appropriate error code is sent as the result value (step 1120) and the operation returns to step 702 of FIG. 7 to wait for a new command to process. If the user authentication for the command is valid (a yes output to step 1104), the operation determines if instance H exists (step 1106).

If instance H does not exist (a no output to step 1106), the appropriate error code is sent as the result value (step 1120) and the operation returns to step 702 of FIG. 7 to wait for a new command to process. If instance H does exist (a yes output to step 1106), the operation determines if instance H is a descendant of the processing instance P (step 1108).

If instance H is not a descendant of the processing instance P (a no output to step 1108), the appropriate error code is sent as the result value (step 1120) and the operation returns to step 702 of FIG. 7 to wait for a new command to process. If instance H is a descendant of the processing instance P (a yes output to step 1108), the operation retrieves the embedded command (step 1110). Next the operation determines if the size indicator of the command is valid (step 1112).

If the size indicator of the command is not valid (a no output to step 1112), the appropriate error code is sent as the result value (step 1120) and the operation returns to step 702 of FIG. 7 to wait for a new command to process. If the size indicator of the command is valid (a yes output to step 1112), the operation determines if the embedded command is allowed to be embedded (step 1114).

If the embedded command is not allowed to be embedded (a no output to step 1114), the appropriate error code is sent as the result value (step 1120) and the operation returns to step 702 of FIG. 7 to wait for a new command to process. If the embedded command is allowed to be embedded (a yes output to step 1114), the operation processes the embedded command in the target virtual TPM instance as if the command has been sent to it directly (step 1116), which can include recursive handling of the command and determining that yet another layer of embedded command is to be processed, repeating steps 1102 through 1116 until no new embedded commands are found. The operation embeds the response message to the embedded command in the response (step 1118). The operation returns to step 702 of FIG. 7 to wait for a new command to process.

Figure 12:
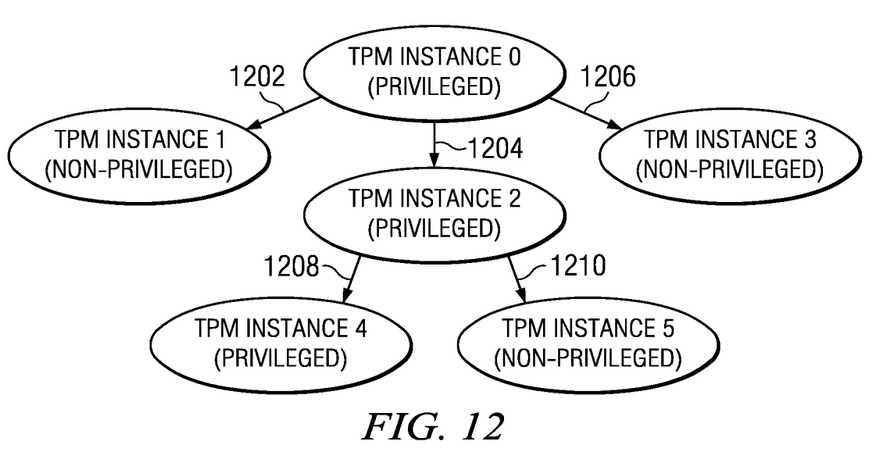
FIG. 12 is a block diagram illustrating a communication path among a hierarchical set of virtual TPMs in accordance with an exemplary embodiment of the present invention.

FIG. 12 is a block diagram illustrating the communication path among a hierarchical set of virtual TPMs in accordance with an exemplary embodiment of the present invention. In a hierarchical set of virtual TPMs, allowed communication paths strictly follow the parent-child relationship. The parent always initiates communication with the child and then the child responds. The child never initiates communication to a parent. Only a predecessor may create or delete a child TPM or send a message to a child TPM.

TPM instance 0 is the initial TPM instance and it is a privileged instance, meaning it has permission to create, delete and set-up child TPMs. TPM instance 1, TPM instance 2, and TPM instance 3 are child TPM instances of TPM instance 0. TPM instance 4 and TPM instance 5 are child TPM instances of TPM instance 2, which is a privileged TPM instance. Of TPM instance 0's three child TPMs, TPM instance 1 and TPM instance 3 are non-privileged, meaning that the permission of parent TPM instance 0 were not passed onto those TPMS and they cannot create, delete or send messages to child TPM instances. TPM instance 2 is privileged and inherited the permission of TPM instance 0. TPM instance 2 created two child instances of its own, TPM instance 4 and TPM instance 5. TPM instance 5 is non-privileged. TPM instance 4 is privileged and inherited the permissions of TPM instance 2, which inherited the permissions of TPM instance 0. Lines 1202, 1204 and 1206 show the communication that TPM instance 0 can have. TPM instance 0 can only communicate with TPM instance 1, TPM instance 2 or TPM instance 3. Lines 1208 and 1210 show the communication that TPM instance 2 can have. TPM instance 2 can only communicate with TPM instance 4 or TPM instance 5.

Figure 13:
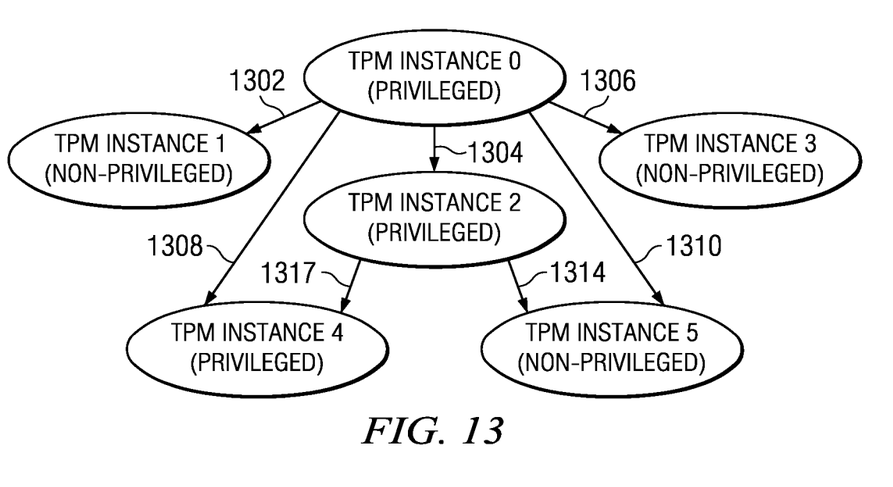
FIG. 13 is a block diagram illustrating an alternative communication path among a hierarchical set of virtual TPMs in accordance with an exemplary embodiment of the present invention.

FIG. 13 is a block diagram illustrating an alternative communication path among a hierarchical set of virtual TPMs in accordance with an exemplary embodiment of the present invention. In another exemplary embodiment of the present invention, any predecessor may create or delete a child and make the child a child of a given parent and send messages to the child. TPM instance 0 is the initial TPM instance and it is a privileged instance, meaning it has permission to create, delete and set-up child TPMs. TPM instance 1, TPM instance 2, and TPM instance 3 are child TPM instances of TPM instance 0. TPM instance 4 and TPM instance 5 are child TPM instances of TPM instance 2, which is a privileged TPM instance. Of TPM instance 0's three child TPMS, TPM instance 1 and TPM instance 3 are non-privileged, meaning that the permission of parent TPM instance 0 were not passed onto those TPMS and they cannot create, delete or communicate with child TPM instances. TPM instance 2 is privileged and inherited the permission of TPM instance 0. TPM instance 2 created two child instances of its own, TPM instance 4 and TPM instance 5. TPM instance 5 is non-privileged. TPM instance 4 is privileged and inherited the permissions of TPM instance 2, which inherited the permissions of TPM instance 0.

Lines 1302, 1304, 1306, 1308 and 1310 show the communication that TPM instance 0 can have. As in FIG. 12, TPM instance 0 can communicate with TPM instance 1, TPM instance 2 or TPM instance 3. However, unlike the architecture shown in FIG. 12, TPM instance 0 may also communicate with TPM instance 4 and TPM instance 5, the child TPMs of TPM instance 0's child TPM, TPM instance 2. TPM instance 0 may treat TPM instance 4 and TPM instance 5 as its own child TPMs and communicate directly with them and delete them. Lines 1312 and 1314 show the communication that TPM instance 2 can have. TPM instance 2 can only communicate with TPM instance 4 or TPM instance 5.

Thus the present invention provides a method, an apparatus and a computer program product for the dynamic creation and hierarchical organization of trusted platform modules.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

The invention claimed is:

1. A computer-implemented method performed by a data processing system for dynamic creation and hierarchical organization of trusted platform modules, the method comprising:

the data processing system creating a trusted platform module domain, wherein a privileged trusted platform module of the trusted platform module domain is operable to dynamically create one or more virtual trusted platform modules in the trusted platform module domain, wherein a trusted platform module is a piece of hardware that provides security and cryptographic functionality to the data processing system, wherein the trusted platform module domain is associated with a given partition of the data processing system having multiple partitions, wherein the given partition of the multiple partitions has a given instance of an operating system running within the given partition, wherein the one or more virtual trusted platform modules are each a software-instantiation of the trusted platform module that provides security and cryptographic functionality for the trusted platform module domain, and wherein the privileged trusted platform module certifies at the privileged trusted platform module a public key part of an endorsement key of a virtual trusted platform module by signing over at the privileged trusted platform module the endorsement key of the virtual trusted platform module using the privileged trusted platform module's own endorsement key, attestation identity key or a general signing key;

creating the one or more virtual trusted platform modules in the trusted platform module domain by the privileged trusted platform module;

sending an array of PCR register indices and hash values of the virtual trusted platform module to a creating trusted platform module, which may either be a virtual trusted platform module or a trusted platform module; and storing string identifiers and the array of PCR register indices and hash values in the virtual trusted platform module to form stored information, wherein the stored information is made available to an operating system associated with the virtual trusted platform module, and wherein each hash value of the hash values is used to extend the PCR registers that are referenced through the indices.

2. The computer implemented method of claim 1, wherein each virtual trusted platform module is associated with a specific partition of a plurality of partitions, wherein each partition of the plurality of partitions is associated with an individual operating system.

3. The computer implemented method of claim 2, wherein virtual machine configuration files determine which virtual trusted platform module is associated with a particular partition.

4. The computer implemented method of claim 1, wherein the trusted platform module domain is a dedicated domain.

5. The computer implemented method of claim 4, wherein creating virtual trusted platform modules is implemented as software in the trusted platform module domain.

6. The computer implemented method of claim 1, further comprising:

creating an endorsement key associated with each virtual trusted platform module.

7. The computer implemented method of claim 1, wherein at least one virtual trusted platform module comprises a virtual privileged trusted platform module which is operable to create other virtual trusted platforms modules; and wherein the at least one virtual trusted platform module comprises a child trusted platform module and wherein either the virtual privileged trusted platform module or the at least one virtual trusted platform module comprises a parent trusted platform module that is operable to create child trusted platform modules.

8. The computer implemented method of claim 7, wherein a child trusted platform module inherits permissions of the parent trusted platform module.

9. The computer implemented method of claim 7, wherein only an immediately preceding parent trusted platform module may communicate with, delete, set up, or create a child trusted platform module.

10. The computer implemented method of claim 1, further comprising:

deleting a virtual trusted platform module.

11. The computer implemented method of claim 10, wherein a virtual trusted platform module may only be deleted if the virtual trusted platform module does not have any child trusted platform modules.

12. The computer implemented method of claim 1, further comprising:

routing embedded commands to a virtual trusted platform module.

13. The computer implemented method of claim 1, further comprising:

creating a plurality of threads, wherein the plurality of threads allow concurrent processing of multiple requests received by the trusted platform module.

14. A computer program product comprising a non-transitory computer readable storage medium including computer usable program code stored thereon for dynamic creation and hierarchical organization of trusted platform modules, said computer program product comprising:

computer usable program code for creating a trusted platform module domain, wherein a privileged trusted platform module of the trusted platform module domain is operable to dynamically create one or more virtual trusted platform modules in the trusted platform module domain, wherein a trusted platform module is a piece of hardware that provides security and cryptographic functionality to the data processing system, wherein the trusted platform module domain is associated with a given partition of the data processing system having multiple partitions, wherein the given partition of the multiple partitions has a given instance of an operating system running within the given partition, wherein the one or more virtual trusted platform modules are each a software-instantiation of the trusted platform module that provides security and cryptographic functionality for the trusted platform module domain, and wherein the privileged trusted platform module certifies at the privileged trusted platform module a public key part of an endorsement key of a virtual trusted platform module by signing over at the privileged trusted platform module the endorsement key of the virtual trusted platform module using the privileged trusted platform module's own endorsement key, attestation identity key or a general signing key;

computer usable program code for creating the one or more virtual trusted platform modules in the trusted platform module domain by the privileged trusted platform module;

computer usable program code for sending an array of PCR register indices and hash values of the virtual trusted platform module to a creating trusted platform module, which may either be a virtual trusted platform module or a trusted platform module; and computer usable program code for storing string identifiers and the array of PCR register indices and hash values in the virtual trusted platform module to form stored information, wherein the stored information is made available to an operating system associated with the virtual trusted platform module, and wherein each hash value of the hash values is used to extend the PCR registers that are referenced through the indices.

15. A data processing system for dynamic creation and hierarchical organization of trusted platform modules, said data processing system comprising:

a storage device, wherein the storage device stores computer usable program code; and a processor, wherein the processor executes the computer usable program code to create a trusted platform module domain, wherein a privileged trusted platform module of the trusted platform module domain is operable to dynamically create one or more virtual trusted platform modules in the trusted platform module domain, wherein a trusted platform module is a piece of hardware that provides security and cryptographic functionality to the data processing system, wherein the trusted platform module domain is associated with a given partition of the data processing system having multiple partitions, wherein the given partition of the multiple partitions has a given instance of an operating system running within the given partition, wherein the one or more virtual trusted platform modules are each a software-instantiation of the trusted platform module that provides security and cryptographic functionality for the trusted platform module domain, and wherein the privileged trusted platform module certifies at the privileged trusted platform module a public key part of an endorsement key of a virtual trusted platform module by signing over at the privileged trusted platform module the endorsement key of the virtual trusted platform module using the privileged trusted platform module's own endorsement key, attestation identity key or a general signing key; create the one or more virtual trusted platform modules in the trusted platform module domain by the privileged trusted platform module; send an array of PCR register indices and hash values of the virtual trusted platform module to a creating trusted platform module, which may either be a virtual trusted platform module or a trusted platform module; and store string identifiers and the array of PCR register indices and hash values in the virtual trusted platform module to form stored information, wherein the stored information is made available to an operating system associated with the virtual trusted platform module, and wherein each hash value of the hash values is used to extend the PCR registers that are referenced through the indices.

\* \* \* \* \*